United States Patent Office 2,771,467
Patented Nov. 20, 1956

2,771,467

STEROID KETALS

Barney J. Magerlein, Kalamazoo, and Robert H. Levin, Kalamazoo Township, Kalamazoo County, Mich., assignors to The Upjohn Company, Kalamazoo, Mich., a corporation of Michigan No Drawing. Application August 31, 1954,
Serial No. 453,445

16 Claims. (Cl. 260—239.55)

The present invention relates to a new class of steroid ketals, the 11-ketosteroid 11-monoketals, and to a novel process for their production.

It is an object of the present invention to provide the novel 11-ketosteroid 11-monoketals and a novel process for their production. A further object is to provide 3,20-dioxygenated-pregnane-11-one 11-monoketals and a process for their production. An additional object is to provide a carbonyl reagent derivative of the 11-keto group in an 11-ketosteroid, which derivative is readily isolated and purified and which is relatively non-reactive but cleavable to an 11-keto group when desired. Other objects will be apparent to one skilled in the art.

The novel 11-ketosteroid 11-monoketals of the present invention are useful in being more easily isolated and purified than the parent 11-ketosteroids in a synthetic process, and in being essentially as non-reactive as the parent 11-ketosteroids, but hydrolyzable with strong acid to provide the parent 11-ketosteroids when desired. These superior properties of the 11-monoketals are particularly advantageous in the synthesis of adrenal cortical hormones such as cortisone or Kendall's Compound F. For example, the 3,11,20-pregnanetrione 11-cyclic monoketal can be converted to cortisone, with retention of an 11-cyclic monoketal group through as many steps as desired in order to facilitate isolation and purification of products, in the same manner as 3,11,20-pregnanetrione is converted to cortisone and other cortical hormones by prior art procedures [e. g. Mancera et al., J. Am. Chem. Soc., 74, 3711 (1952); Kritchevsky et al., ibid., 74, 483 (1952)]. Hydrolysis with strong acid converts the 11-cyclic monoketal group to an 11-keto group at any desired step in the synthesis. The 3,20-dihydroxy- and 3,20-diacyloxypregnane-11-one 11-cyclic monoketals also can be converted to cortisone and other cortical hormones advantageously in the same manner. Other uses will be apparent to one skilled in the art.

Of the novel 11-ketosteroid 11-monoketals of the present invention, those of particular interest are the 3,20-dioxygenated-pregnane-11-one 11-monoketals, especially the 3,20-dihydroxy-, 3,20-diketo-, and 3,20-diacyloxy-pregnane-11-one 11-cyclic monoketals which may be represented by the structural formula:

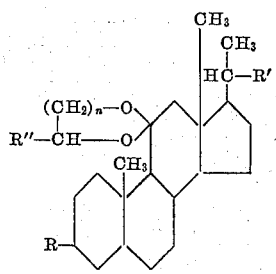

and wherein R and R' are selected from the group consisting of hydroxy, keto, and acyloxy of the Formula AcO, Ac being the acyl radical of a carboxylic acid, especially such acids containing from one to eight carbon atoms, inclusive, illustrative acids being formic, acetic, propionic, butyric, valeric, hexanoic, heptanoic, octanoic, succinic, cyclopentanoic, cyclohexanoic, benzoic, toluic, etc. with lower-aliphatic acids being preferred; and wherein R" is selected from the group consisting of hydrogen and lower-alkyl radicals, illustratively methyl, ethyl, propyl, isopropyl, butyl, 1-methylpropyl, amyl, hexyl, etc.; and wherein $n$ is an integer from one to two. The 11-lower-alkylene glycol ketals, formed from 1,2-alkanediols, are preferred.

According to the method of the present invention, an 11-monoketosteroid is reacted with a ketalizing agent in the presence of an acid catalyst at a temperature between about twenty and about 200 degrees centigrade, to produce an 11-monoketosteroid 11-monoketal. Hydroxy-substituted-11-monoketosteroid 11-monoketals, e. g., 3,20-dihydroxypregnane-11-one 11-cyclic monoketals, are converted to 11-ketosteroid 11-monoketals containing additional keto groups, e. g., 3,11,20-pregnanetrione 11-cyclic monoketals by reaction with an oxidizing agent.

Many 11-monoketosteroids, the starting compounds for the ketalization process of the present invention, are known. The particularly interesting 3,20-dihydroxy- and 3,20-diacyloxypregnane-11-ones, such as, for example, 3α,20-dihydroxypregnane-11-one and 3α,20-diacetoxy-pregnane-11-one, and related substituted pregnane-11-ones, can be prepared as described by Sarett [J. Am. Chem. Soc., 71, 1175 (1949)]. Other 11-monoketosteroids can be prepared by oxidation (e. g. with chromic acid) of 11-hydroxysteroids, which can be obtained, for example, by biooxidation (Murray and Peterson, U. S. Patent 2,602,769).

Preferred ketalizing agents for the present process are the cyclic-ketal-forming ketalizing agents, particularly the alkane-1,2-diols and alkane-1,3-diols, illustratively, ethylene glycol, propane-1,2-diol, propane-1,3-diol, butane-1,2-diol, pentane-1,2-diol, 3-methylpentane-1,2-diol, hexane-1,3-diol, octane-1,2-diol, 3-methyloctane-1,2-diol, decane-1,2-diol, etc. However other ketalizing agents, e. g. alcohols, illustratively ethanol, which form ketals that are not cyclic, may be employed if desired.

The acid catalyst used in the ketalization process of the present invention is suitably a mineral acid or an organic sulfonic acid, normally only a trace amount being added, i. e. an amount below about 10 percent by weight of the amount of starting steroid. Representative catalysts are hydrochloric acid, sulfuric acid, meta- and para-toluenesulfonic acids, naphthalenesulfonic acid, benzenesulfonic acid, or ortho-chloro-benzenesulfonic acid, with para-toluenesulfonic acid being the preferred acid catalyst.

In carrying out the ketalization process of the present invention, the starting 11-monoketosteroid is admixed, the order of addition being unimportant, with at least the theoretical amount of ketalizing agent, preferably between about five and about fifty moles of ketalizing agent per mole of starting steroid, and a trace amount of acid catalyst, at a temperature between about twenty and about 200 degrees centigrade, preferably between about fifty and about 150 degrees centigrade, for a reaction period of between about one hour and about two weeks, preferably between about twelve hours and three days the length of time being dependent in part on the temperature, ketalizing agent, and catalyst employed. Normally the reaction is conducted using an organic solvent with which the reactants and products are non-reactive, illustratively, benzene, toluene, xylene, nitrobenzene, methylene chloride, methylene dinitrobenzene, petroleum ether, ether, nitrotoluene, etc., preferred solvents being those which form an azeotrope with water, so that water can be removed as it is formed in the course of the reaction when the temperature employed is about the boiling point of the reaction mixture.

Oxidation of hydroxy groups in hydroxy-substituted-11-monoketosteroid 11-monoketals to produce 11-ketosteroid 11-monoketals containing additional keto groups is accomplished by using an oxidizing agent, illustratively potassium permanganate under neutral, basic, or mildly acidic conditions, or chromic acid dissolved in acetic acid under substantially anhydrous conditions. In general strongly acidic reaction conditions are to be avoided, unless hydrolysis of the 11-ketal group to an 11-keto group is also desired.

The following examples illustrate the processes and products of the present invention but are not to be construed as limiting.

*Example 1.—3α,20-dihydroxypregnane-11-one 11-ethylene glycol ketal*

A mixture of 200 milligrams of 3α,20-dihydroxypregnane-11-one, five milliliters of ethylene glycol, a trace of para-toluene-sulfonic acid monohydrate (10 to 20 milligrams) and 100 milliliters of benzene was placed in a reaction flask which was equipped with a reflux condenser and a water trap so arranged that the condensed vapors passed through the water trap before returning to the reaction flask. The mixture was heated to reflux and was allowed to reflux for eighteen hours while, at the same time, being agitated. The water which formed was removed by co-distillation with benzene and was collected in the water trap. The reaction mixture was cooled, washed with a dilute solution of sodium bicarbonate, and water, and dried. Removal of the solvent under reduced pressure yielded 222 milligrams of crude 3α,20-dihydroxypregnane-11-one 11-ethylene glycol ketal melting at 205 to 215 degrees centigrade. Recrystallization from methanol gave pure 3α,20-dihydroxypregnane-11-one 11-ethylene glycol ketal melting at 241 to 245 degrees centigrade.

*Analysis.*—Percent calculated for $C_{23}H_{38}O_4$: C, 72.97; H, 10.12. Found: C, 73.00; H, 10.22.

*Example 2.—3,11,20-pregnanetrione 11-ethylene glycol ketal*

Oxidation of 3α,20-dihydroxypregnane-11-one 11-ethylene glycol ketal from Example 1 with chromic acid in acetic acid solution at room temperature yields 3,11,20-pregnanetrione-11-ethylene glycol ketal.

Hydrolysis of 3,11,20-pregnanetrione 11-ethylene glycol ketal with dilute sulfuric acid produces 3,11,20-pregnanetrione, melting point 158 to 161 degrees centigrade. The isolation and purification of the 3,11,20-pregnanetrione 11-ethylene glycol ketal is accomplished more readily than with the parent 3,11,20-pregnanetrione.

*Example 3.—3β,20-dihydroxypregnane-11-one 11-propane-1',2'-diol ketal*

In the same manner as given in Example 1, 3β,20-dihydroxypregnane-11-one 11-propane-1',2'-diol ketal is prepared using a mixture of 3β,20-dihydroxypregnane-11-one, propane-1,2-diol, para-toluenesulfonic acid monohydrate and benzene.

*Example 4.—3α,20-diacetoxypregnane-11-one 11-butane-1',2'-diol ketal*

3α,20-diacetoxypregnane-11-one 11-butane-1',2'-diol ketal is prepared from 3α,20-diacetoxypregnane-11-one in the same manner as given in Example 1 by using butane-1,2-diol instead of ethylene glycol as the ketal forming agent and using sulfuric acid instead of para-toluenesulfonic acid as the catalyst. Hydrolysis of 3α,20-diacetoxypregnane-11-one 11-butane-1',2'-diol ketal using sodium hydroxide dissolved in aqueous alcohol gives 3α,20-dihydroxypregnane-11-one 11-butane-1',2'-diol ketal.

*Example 5.—3α,20-diacetoxypregnane-11-one 11-ethylene glycol ketal*

In the same manner as given in Example 1, 3α,20-diacetoxypregnane-11-one 11-ethylene glycol ketal is prepared from 3α,20-diacetoxypregnane-11-one by reaction with ethylene glycol in the presence of para-toluenesulfonic acid. 3α,20-diacetoxypregnane-11-one 11-ethylene glycol ketal is readily hydrolyzed with aqueous potassium hydroxide using ethyl alcohol as a solvent to produce 3α,20-dihydroxypregnane-11-one 11-ethylene glycol ketal which melts at 242–245 degrees centigrade and is identical with the product of Example 1. This high-melting 11-ketal compound is more readily isolated and purified than the lower melting parent 3α,20-dihydroxypregnane-11-one; melting point 217 to 220 degrees centigrade.

*Example 6.—11-ketoetiocholane 11-ethylene glycol ketal*

11-ketoetiocholane [Reichstein, Ergeb. Vitamin-Hormonforsch, 1, 352 (1938)] when heated with an excess of ethylene glycol and a trace of para-toluenesulfonic acid monohydrate using benzene as the solvent, following the method of Example 1, gives 11-ketoetiocholane 11-ethylene glycol ketal.

*Example 7.—3α,17α-dihydroxyetiocholane-11-one 11-ethylene glycol ketal*

In the same manner as shown in Example 6, 3α,17α-dihydroxyetiocholane-11-one is converted to 3α,17α-dihydroxyetiocholane-11-one 11-ethylene glycol ketal.

*Example 8.—3α,17α-dihydroxyetiocholane-11-one 3,17-diacetate 11-ethylene glycol ketal*

Using 3α,17α-dihydroxyetiocholane-11-one 3,17-diacetate in place of the 11-ketoetiocholane in Example 6 produces 3α,17α-dihydroxyetiocholane-11-one 3,17-diacetate 11-ethylene glycol ketal. Hydrolysis of this thus-produced 11-ethylene glycol ketal with potassium hydroxide in aqueous methanol solution yields 3α,17α-dihydroxyetiocholane-11-one 11-ethylene glycol ketal which is identical with the product of Example 7.

*Example 9.—3α,20-dipropionoxypregnane-11-one 11-propane-1',3'-diol ketal*

Using the procedure of Example 1, 3α,20-dipropionoxypregnane-11-one 11-propane-1',3'-diol ketal is prepared from 3α,20-dipropionoxypregnane-11-one by using propane-1,3-diol in place of ethylene glycol. Hydrolysis of 3α,20-dipropionoxypregnane-11-one 11-propane-1',3'-diol ketal using dilute sulfuric acid yields 3α,20-dihydroxypregnane-11-one, melting point 217–219 degrees centigrade.

*Example 10.—3α,17α-dihydroxyetiocholane-11-one 3-benzoate 17-acetate 11-ethylene glycol ketal*

3α,17α-dihydroxyetiocholane-11-one 3-benzoate 17-acetate used in place of 11-ketoetiocholane in the method of Example 6, provides 3α,17α-dihydroxyetiocholane-11-one 3-benzoate 17-acetate 11-ethylene glycol ketal. Hydrolysis of the thus-produced 11-ketal with dilute sulfuric acid yields 3α,17α-dihydroxyetiocholane-11-one, melting at 253–255 degrees centigrade, a compound less readily isolated and purified than the 3α,17α-dihydroxyetiocholane-11-one 11-ethylene glycol ketal obtained in Example 7.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:
1. 3,20-dioxygenated-pregnane-11-one 11-cyclic monoketal having the formula

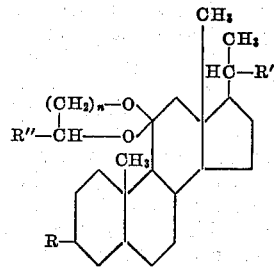

wherein R and R' are selected from the group consisting of hydroxy, keto, and acyloxy of the formula AcO, Ac being the acyl radical of a hydrocarbon carboxylic acid containing from one to eight carbon atoms, inclusive; and wherein R" is selected from the group consisting of hydrogen and lower-alkyl radicals containing from one to six carbon atoms, inclusive; and wherein n is an integer from one to two, inclusive.

2. 3,20-dihydroxypregnane-11-one 11-cyclic monoketal having the formula

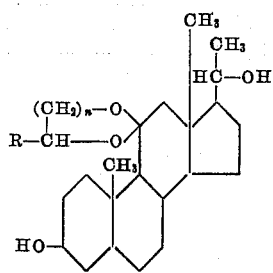

wherein R is selected from the group consisting of hydrogen and lower-alkyl radicals containing from one to six carbon atoms, inclusive; and wherein n is an integer from one to two inclusive.

3. 3α,20-dihydroxypregnane-11-one 11-ethylene glycol ketal.

4. 3α,20-dihydroxypregnane-11-one 11-propane-1',2'-diol ketal.

5. 3,11,20-pregnanetrione 11-cyclic monoketal having the formula

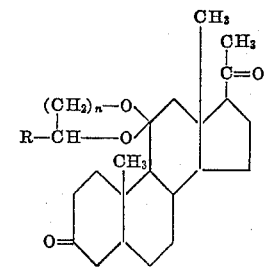

wherein R is selected from the group consisting of hydrogen and lower-alkyl radicals containing from one to six carbon atoms, inclusive; and wherein n is an integer from one to two inclusive.

6. 3,11,20-pregnanetrione 11-ethylene glycol ketal.

7. 3,20-diacyloxypregnane-11-one 11-cyclic monoketal having the formula

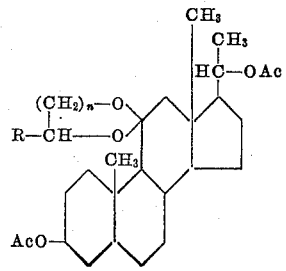

wherein AcO is acyloxy, Ac being the acyl radical of a hydrocarbon carboxylic acid containing from one to eight carbon atoms inclusive; and wherein R is selected from the group consisting of hydrogen and lower-alkyl radicals containing from one to six carbon atoms inclusive; and wherein n is an integer from one to two, inclusive.

8. 3α,20-diacetoxypregnane-11-one 11-ethylene glycol ketal.

9. In a process for the production of 3,20-dioxygenated-pregnane-11-one 11-cyclic monoketal having the formula

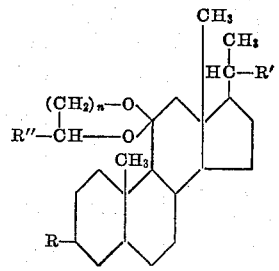

wherein R and R' are selected from the group consisting of hydroxy, keto, and acyloxy of the formula AcO, Ac being the acyl radical of a carboxylic acid containing from one to eight carbon atoms inclusive; and wherein R" is selected from the group consisting of hydrogen and alkyl; and wherein n is an integer from one to two, inclusive, the step which comprises reacting 11-ketosteroid of the formula

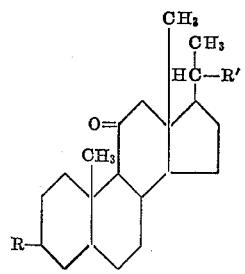

wherein R and R' are selected from the group consisting of hydroxy and acyloxy of the formula AcO, Ac being the acyl radical of a carboxylic acid containing from one to eight carbon atoms inclusive, with a ketalizing agent selected from the group consisting of alkane-1,2-diols and alkane-1,3-diols in the presence of an acid catalyst and an organic solvent at a temperature between about fifty and about 150 degrees centigrade to produce 11-ketosteroid 11-cyclic monoketal.

10. A process which comprises reacting 3,20-dihydroxypregnane-11-one with an excess of ketalizing agent selected from the group consisting of alkane-1,2-diols and alkane-1,3-diols containing from two to eight carbon atoms, inclusive, in the presence of an acid catalyst and an organic solvent which forms an azeotrope with water, at a temperature about the boiling point of the mixture; removing water as formed in the course of the reaction; and separating thus-produced 3,20-dihydroxypregnane-11-one 11-cyclic monoketal.

11. A process which comprises reacting 3α,20-dihydroxypregnane-11-one with an excess of ethylene glycol in the presence of a trace amount of acid catalyst, and an organic solvent which forms an azeotrope with water, at a temperature about the boiling point of the mixture; removing water as formed in the course of the reaction; and separating thus-produced 3α,20-dihydroxypregnane-11-one 11-ethylene glycol ketal.

12. A process which comprises reacting 3α,20-dihydroxypregnane-11-one with an excess of propane-1,2-diol in the presence of a trace amount of acid catalyst, and an organic solvent which forms an azeotrope with water, at a temperature about the boiling point of the mixture; removing water as formed in the course of the reaction;

and separating thus-produced 3α,20-dihydroxypregnane-11-one 11-propane-1′,2′-diol ketal.

13. A process which comprises reacting 3,20-dihydroxypregnane-11-one with an excess of ketalizing agent selected from the group consisting of alkane-1,2-diols and alkane-1,3-diols containing from two to eight carbon atoms, inclusive, in the presence of an acid catalyst and an organic solvent which forms an azeotrope with water, at a temperature about the boiling point of the mixture; removing water as formed in the course of the reaction; oxidizing resulting 3,20-dihydroxypregnane-11-one 11-cyclic monoketal with an oxidizing agent under conditions other than strongly acidic conditions; and separating thus-produced 3,11,20 - pregnanetrione 11 - cyclic monoketal.

14. A process which comprises reacting 3α,20-dihydroxypregnane-11-one with an excess of ethylene glycol in the presence of a trace amount of acid catalyst, and an organic solvent which forms an azeotrope with water, at a temperature about the boiling point of the resulting mixture; removing water as formed in the course of the reaction; separating resulting 3α,20-dihydroxypregnane-11-one 11-ethylene glycol ketal; oxidizing 3α,20-dihydroxypregnane-11-one 11-ethylene glycol ketal with an oxidizing agent under conditions other than strongly acidic conditions; and separating thus-produced 3,11,20-pregnanetrione 11-ethylene glycol ketal.

15. A process which comprises reacting 3,20-diacyloxypregnane-11-one, wherein acyloxy is of the formula AcO, Ac being the acyl radical of a carboxylic acid containing from one to eight carbon atoms, inclusive, with an excess of ketalizing agent selected from the group consisting of alkane-1,2-diols and alkane-1,3-diols containing from two to eight carbon atoms, inclusive, in the presence of an acid catalyst and an organic solvent which forms an azeotrope with water, at a temperature about the boiling point of the mixture; removing water as formed in the course of the reaction; and separating thus-produced 3,20-diacyloxypregnane-11-one 11-cyclic monoketal.

16. A process which comprises reacting 3α,20-diacetoxypregnane-11-one with an excess of ethylene glycol in the presence of a trace amount of acid catalyst, and an organic solvent which forms an azeotrope with water, at a temperature about the boiling point of the mixture; removing water as formed in the course of the reaction; and separating thus-produced 3α,20-diacetoxypregnane-11-one 11-ethylene glycol ketal.

References Cited in the file of this patent
UNITED STATES PATENTS

| | | |
|---|---|---|
| 2,288,854 | Stavely | July 7, 1942 |
| 2,352,568 | Reichstein | June 27, 1944 |
| 2,378,918 | Fernholz | June 26, 1945 |